(12) United States Patent
Weber et al.

(10) Patent No.: US 9,014,076 B2
(45) Date of Patent: Apr. 21, 2015

(54) METHOD AND SYSTEM FOR COMMUNICATING WITH MULTIPLE USER COMMUNITIES VIA A MAP

(75) Inventors: Karon A Weber, San Francisco, CA (US); Jonathan Trevor, Santa Clara, CA (US); Edward Ho, San Jose, CA (US); Samantha Tripodi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/414,223

(22) Filed: Mar. 7, 2012

(65) Prior Publication Data

US 2012/0166972 A1   Jun. 28, 2012

Related U.S. Application Data

(63) Continuation of application No. 11/361,268, filed on Feb. 24, 2006, now Pat. No. 8,139,514.

(51) Int. Cl.
*H04H 20/71* (2008.01)
*H04L 29/08* (2006.01)

(52) U.S. Cl.
CPC ............. *H04L 67/24* (2013.01); *H04L 67/22* (2013.01); *H04L 67/18* (2013.01)

(58) Field of Classification Search
CPC ..... H04H 20/71; H04W 72/005; H04W 4/06; H04L 12/189; H04L 5/0007; H04L 12/185
See application file for complete search history.

(56) References Cited

U.S. PATENT DOCUMENTS

| | | | |
|---|---|---|---|
| 2002/0059024 A1* | 5/2002 | Ogaki ............................ | 701/208 |
| 2002/0091758 A1* | 7/2002 | Singh et al. .................... | 709/203 |
| 2004/0001114 A1* | 1/2004 | Fuchs et al. ................... | 345/855 |
| 2004/0221028 A1* | 11/2004 | Gaddamanugu et al. ..... | 709/223 |
| 2005/0055639 A1* | 3/2005 | Fogg ............................. | 715/535 |
| 2005/0130680 A1* | 6/2005 | Northcutt ...................... | 455/457 |
| 2005/0172001 A1* | 8/2005 | Zaner et al. ................... | 709/205 |
| 2007/0032945 A1* | 2/2007 | Kaufman ....................... | 701/208 |

* cited by examiner

*Primary Examiner* — Ayaz Sheikh
*Assistant Examiner* — Hai-Chang Hsiung
(74) *Attorney, Agent, or Firm* — James J. DeCarlo; Greenberg Traurig, LLP

(57) ABSTRACT

A method, device, and system for communicating with multiple users via a map over the Internet are disclosed. The device includes a processor for executing computer programs, a memory for storing data, an input module for entering user commands, a communication module for transmitting and receiving data, and a display for showing information on a screen. The device includes logic for showing at a top level multiple communities across the world for selection and further magnification of their locations by the user. Thus the user can keep track of multiple communities in a multilevel viewing environment.

12 Claims, 11 Drawing Sheets

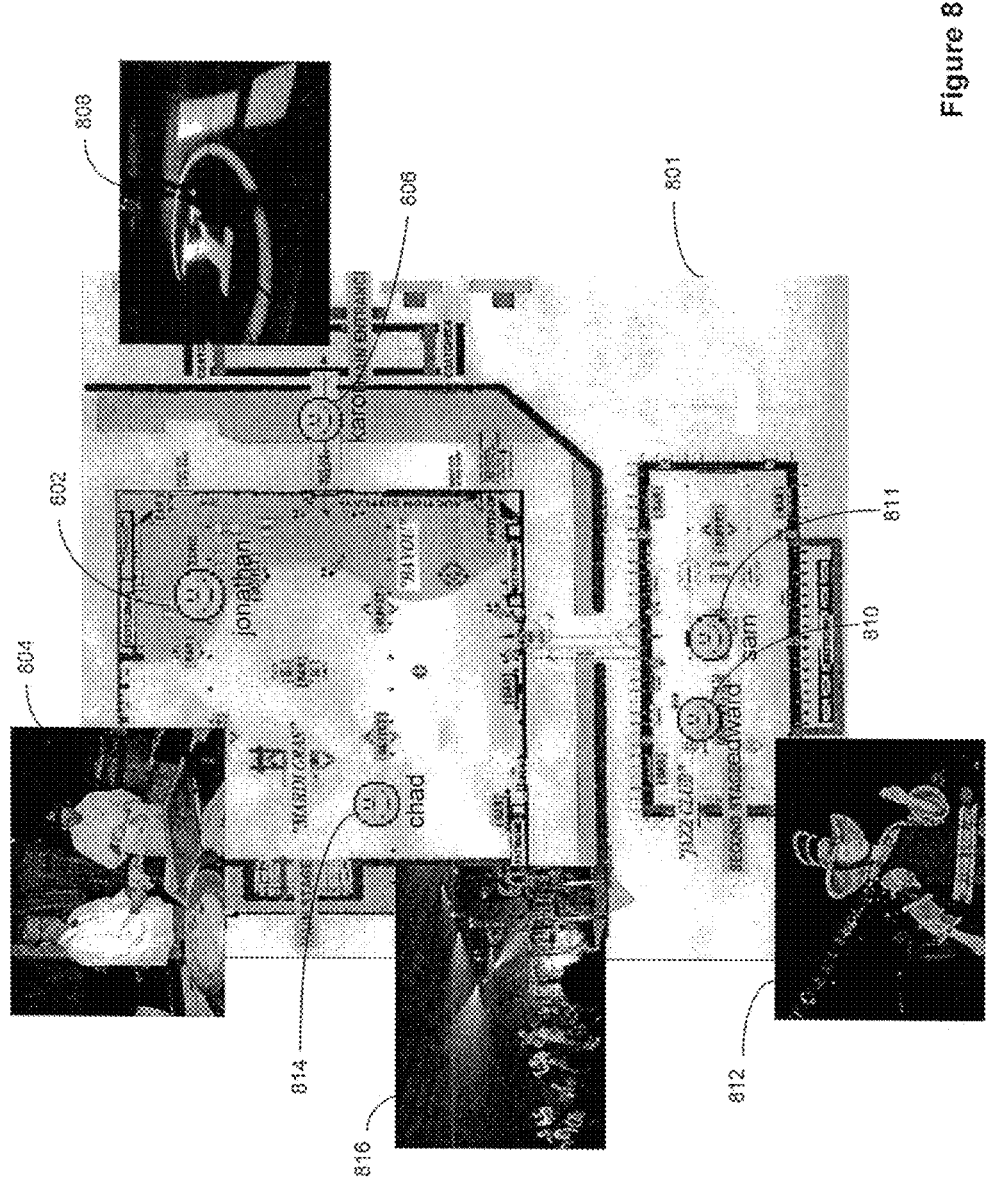

METHOD AND SYSTEM FOR COMMUNICATING WITH MULTIPLE USER COMMUNITIES VIA A MAP

CROSS-REFERENCE TO RELATED APPLICATIONS

This application is a continuation of U.S. Non-Provisional application Ser. No. 11/361,268, filed on Feb. 24, 2006, entitled "Method and System for Communicating with Multiple Users via a Map over the Internet", now U.S. Pat. No. 8,139,514, which is related to a concurrently filed U.S. Non-Provisional application Ser. No. 11/361,236, now U.S. Pat. No. 7,450,003, the entireties of which is incorporated herein by reference.

FIELD OF THE INVENTION

The present invention relates to the field of Internet Applications. In particular, the present invention relates to a method and system for communicating with multiple users via a map over the Internet.

BACKGROUND OF THE INVENTION

In recent years, the global position system (GPS) has been widely adopted to assist motorists to navigate the road when driving to a destination. Many automobile manufacturers offer GPS navigation devices built in to the dash-board of the automobiles. In addition, there are portable GPS navigation devices that perform functions to those of the built-in GPS devices in the automobiles, and the users can transfer them to be used in different cars. This type of GPS navigation device identifies the locations of the motorists on a highway via satellites and provides navigational instructions to the motorists while they are driving. There is another type of portable GPS navigation device that is used by hikers to identify their locations in the mountains. However, these types of GPS devices do not work when the users are inside buildings, such as a shopping mall, or in large open spaces such as an amusement park where geographic information may not exist. Moreover, the current GPS navigation devices do not support communications among multiple users regarding their respective locations.

In circumstances when a group of users need to find each other in a large building or in an amusement park, they use their cellular phones to call each other back and forth, communicating information such as where their locations are, what their surroundings look like, and how to find each other. Such phone calls back and forth are inefficient and time-consuming.

Another conventional solution to this problem is to use the short message service (SMS) technology whereby each user can send a short text message to the group informing them of her location. This is an improvement over the cellular phone method as the text message is broadcasted to all members of the group (one-to-many communication) as opposed to two people talking on their respective cellular phones (point-to-point communication). However, this group of users communicates with each other without a clear idea of the location of the other members. They rely on each other's text description of their respective locations, which may be hard to describe or may take a long time to type into a mobile device. In some cases, some people are not comfortable in describing navigational or directional (north, east, south, west) instructions, which typically lead to wrong directions and a waste of time.

Therefore, there is a need for a method and system to keep track of the locations of members in a user-defined group. There is a need for a method and system for communicating with multiple users via a map over the Internet.

SUMMARY

In one embodiment, a method for communicating with multiple users via a map over the Internet includes creating a map to share among a group of users, where each user uses a client device to communicate with other users in the group, displaying locations of the group of users on the map, where each user is represented by an icon, and broadcasting changes of a user's location to the group over the Internet.

In another embodiment, a device for communicating with multiple users via a map over the Internet includes a processor for executing computer programs, a memory for storing data, an input module for entering user commands, a communication module for transmitting and receiving data, and a display for showing information on a screen. The device further includes logic for selecting a group of users, logic for creating a map to share among the group of users, logic for displaying locations of the group of users on the map, and logic for broadcasting changes of a user's location to the group over the Internet.

In yet another embodiment, a system for communicating with multiple users via a map over the Internet includes a back-end location storage system for storing user location information, a back-end map server for processing maps, a front-end map server for interfacing between client devices, the back-end location storage system, and the back-end map server through a communication network. The front-end map server further includes means for creating a map to share among a group of users, means for monitoring locations of the group of users on the map, and means for broadcasting changes of a user's location to the group over the Internet.

BRIEF DESCRIPTION OF THE DRAWINGS

The aforementioned features and advantages of the invention as well as additional features and advantages thereof will be more clearly understandable after reading detailed descriptions of embodiments of the invention in conjunction with the following drawings.

FIG. 8 illustrates a method for tagging contextual media to personal locations on a map according to an embodiment of the present invention.

DESCRIPTION OF EMBODIMENTS

Methods and systems are provided for communicating with multiple users via a map over the Internet. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description which follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
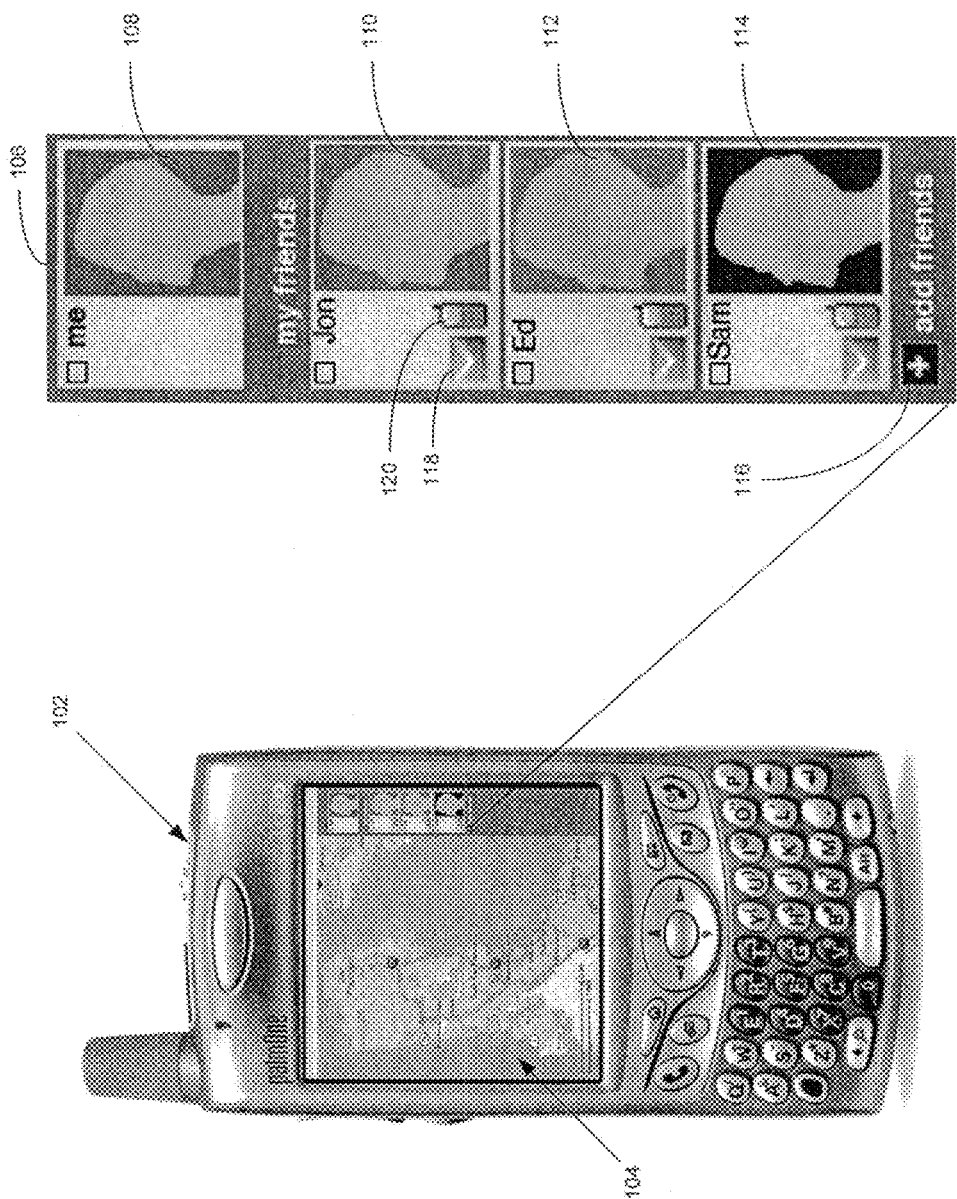
FIG. 1 illustrates a device and method for communicating with friends on a map according to an embodiment of the present invention.

FIG. 1 illustrates a device and method for communicating with friends on a map according to an embodiment of the present invention. In general, any mobile device, such as cellular phones or personal digital assistants (PDAs), may be used to implement the functions of the present invention. In this example, the device for communicating with friends is a palmOne mobile device made by Palm, Inc. at 950 W. Maude Ave., Sunnyvale, Calif. In this specification, the term "friend (s)" is used generally to refer to anyone the user considers as a member in a user-defined community (also referred to as community, user-defined group, or group for short) that is interested in monitoring each other's location and status. Examples of a member of the user-defined community may be a friend, a relative, a colleague, an acquaintance, or a person to be met for the first time. On the screen of the mobile device, a general vicinity of the map 104 of interest is displayed. In the right-hand column of the screen 106, icons representing the user (me) 108 and the user's friends Jon 110, Ed 112, and Sam 114 are shown. The user-defined community can be assembled from an address book, invitation service, group membership. In another approach, the user may manually add friends to the community by using the add-friends button 116, or the user may also delete a friend from the community. Next to each friend's icon in the right-hand column, there is an email icon 118 that allows the user to send an email to that friend, and there is a phone icon 120 that allows the user to make a phone call to that friend. Once the email or phone icon is selected and pressed, the mobile device automatically retrieves the email address or phone number respectively from the user's address book to initial the email or phone call.

Figure 2:
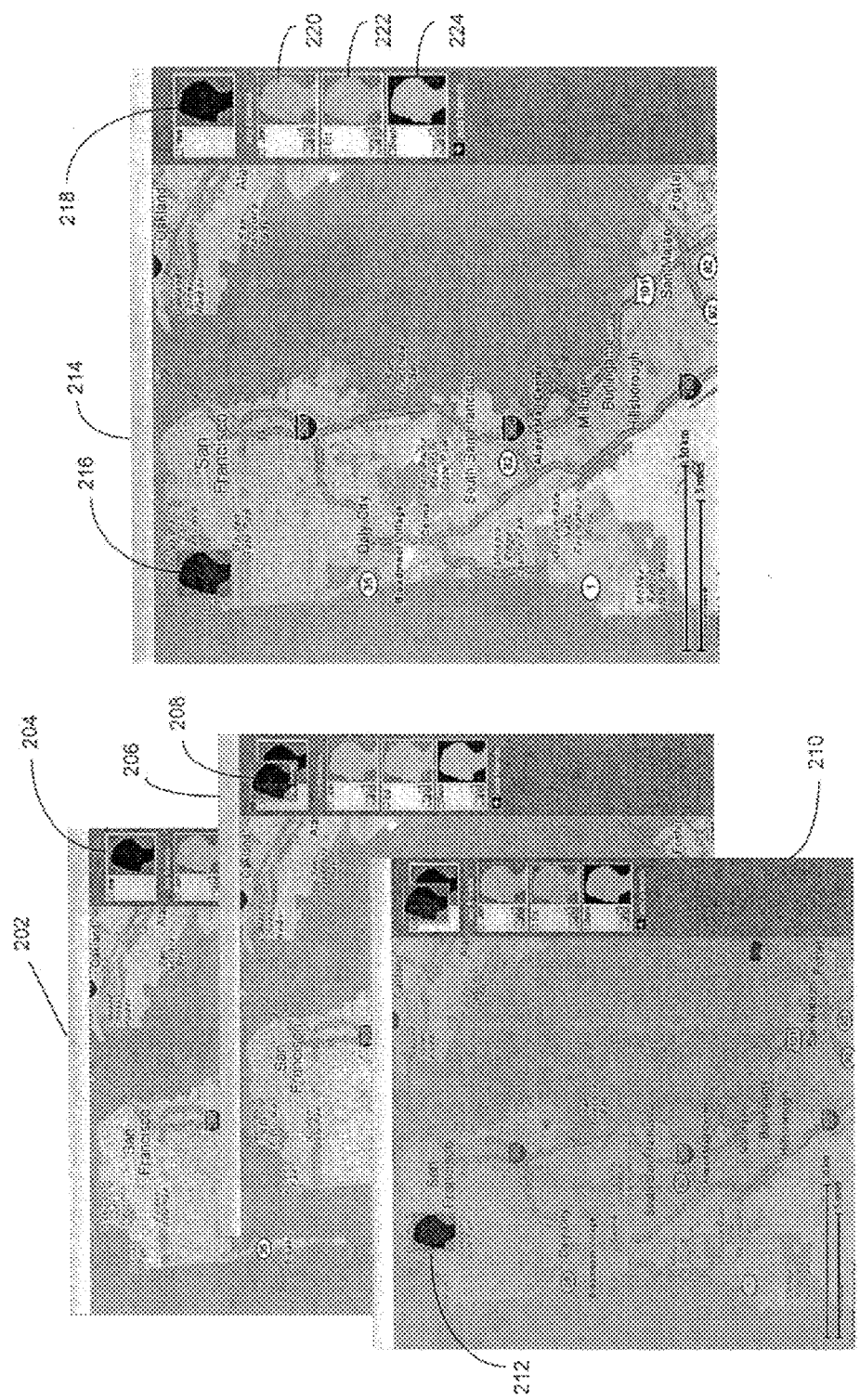
FIG. 2 illustrates a method for placing a user onto a map according to an embodiment of the present invention.

FIG. 2 illustrates a method for placing a user onto a map according to an embodiment of the present invention. As shown in FIG. 2, a series of screen shots are shown to illustrate the steps in placing the user onto a map. In the first screen 202, the user icon 204 is selected to be placed onto the map. The user icon 204 is highlighted after it has been selected. In the second screen 206, the user icon 208 is being dragged to a location on the map. In one approach, portions of the map may be highlighted to indicate they are valid drop targets when the dragged user icon crosses over map boundaries. On the third screen 210, the user icon 212 is on top of a valid drop target representing the user's current location in the map. Finally, on the fourth screen 214, the user icon 216 is released and overlaid on the map. If the user icon being dragged is on top of an invalid drop target, the user icon would not be overlaid on the map. The user icon 218 in the right-hand column remains to be highlighted, indicating the user has placed herself on the map. In this approach, the location of the user on the map is determined by a self-placement location directed by the user. In another approach, the location of the user on the map may be determined by using textual data, such as an address or a business name, supplied by the user. In yet another approach, the location of the user on the may be determined by using a picture of the area such as an airplane view of an area or a picture of the location such as a picture of the front entrance of a business. After the user icon 218 has been placed on the map, an alert message may be forwarded to the user's friends to inform them the user is on the map. Other icons of the friends who have not yet placed themselves on the map, such as the icons for Jon 220, Ed 222, and Sam 224, remain faded on the screen of the user's mobile device.

Figure 3:
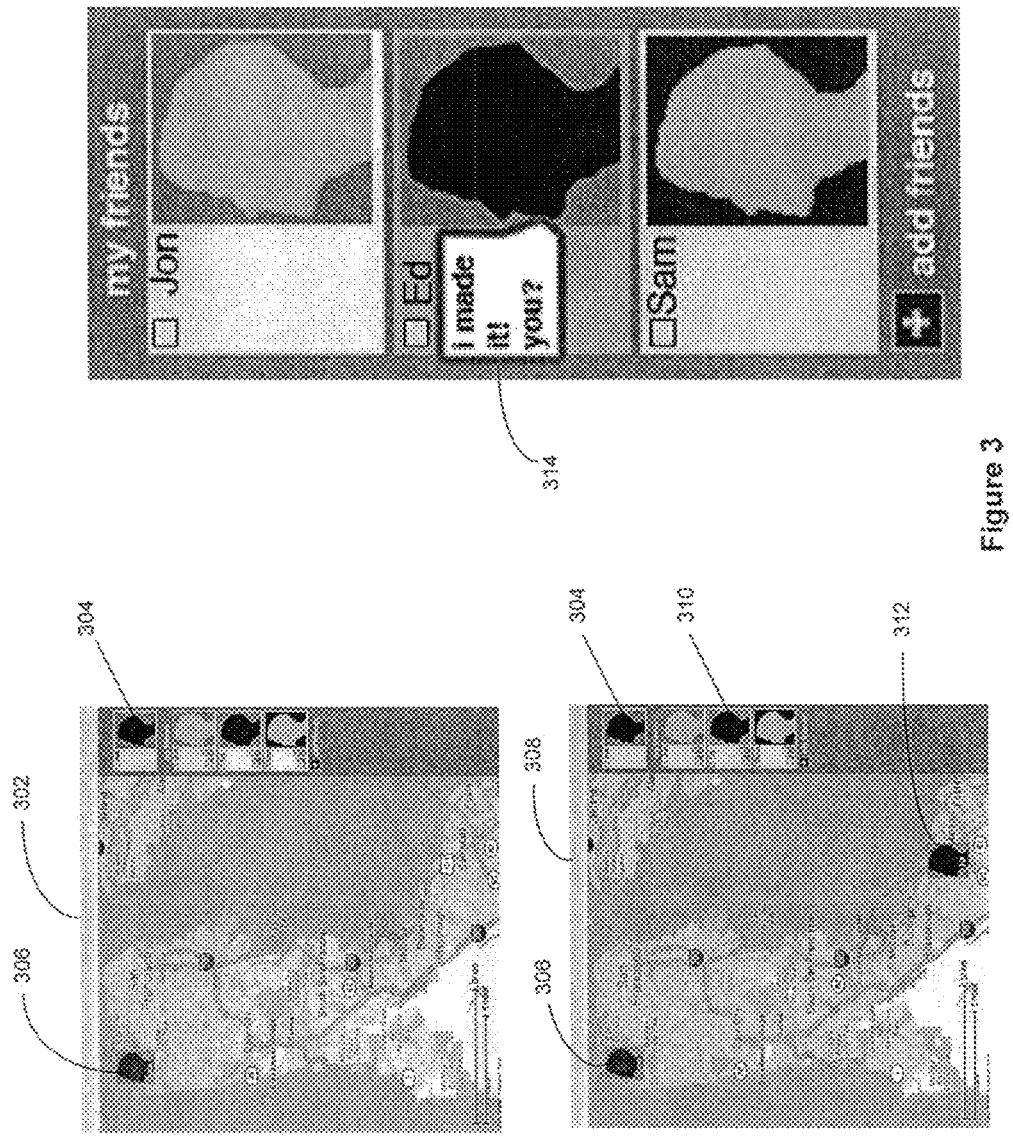
FIG. 3 illustrates graphical representations showing where the user's friends are according to an embodiment of the present invention.

FIG. 3 illustrates graphical representations showing where the user's friends are according to an embodiment of the present invention. The first screen 302 shows the user 304 has placed herself on the map in San Francisco as icon 306, while other users in the user-defined community have not yet placed themselves on the map. In the second screen 308, a second user Ed 310 has placed himself on the map near Foster City as icon 312. After a user has placed herself on the map, the user may post short instant messages (IM) from a set of previously prepared short message service (SMS) type of messages or by typing in her own message. The SMS technology is used to send queries as text messages over mobile devices. Examples of short instant messages are: "I'm here", "On my way", "Late", "Made it", "Where are you?", "Call me", "I'm lost. Help!". In general, a message sent from a user may be in any format, such as voice, text, video, image, or graphics. In this case, once Ed has placed himself on the map, he posts the message "made it! you?" as shown in the dialog box 314. Other friends in the group would receive this message from Ed.

Figure 4:
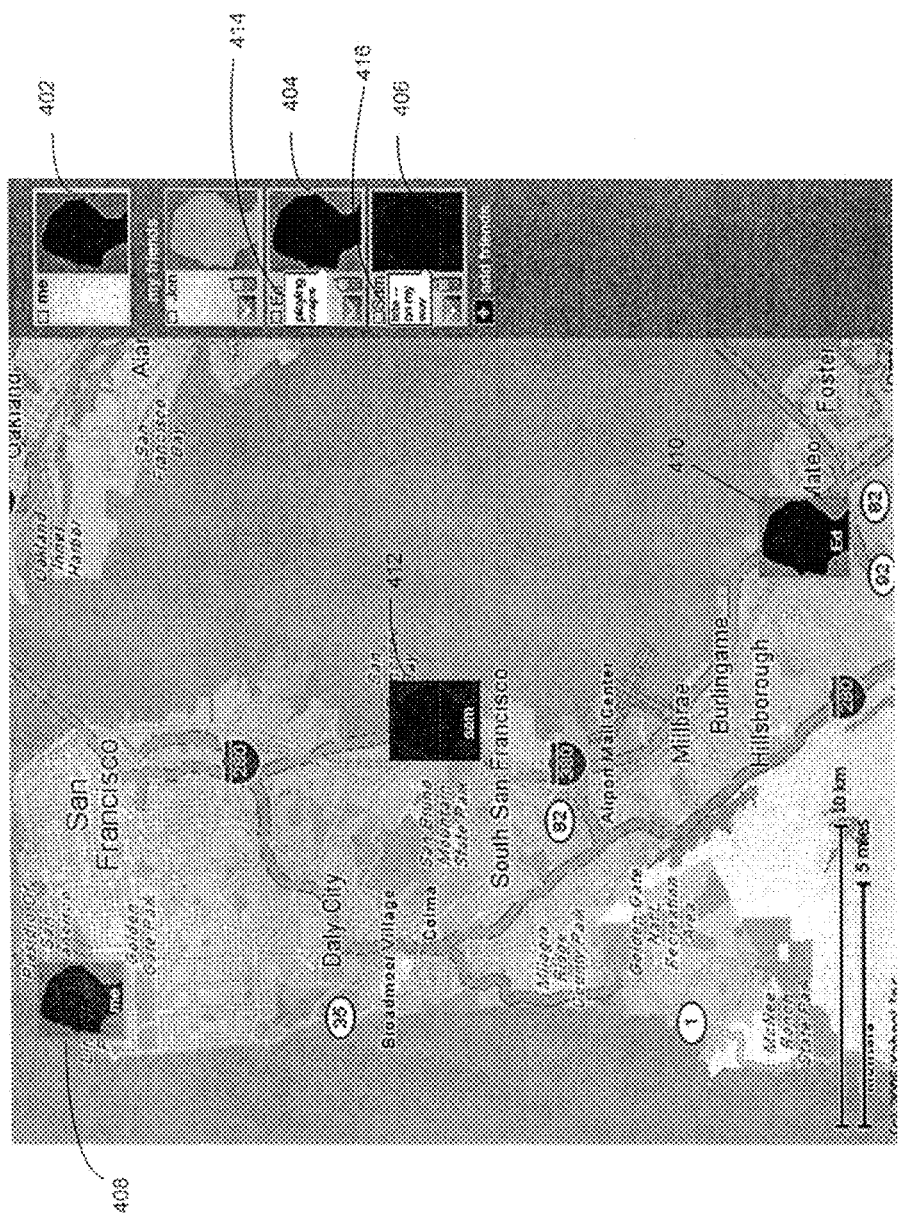
FIG. 4 illustrates a graphical representation for communicating with friends on a map according to an embodiment of the present invention.

FIG. 4 illustrates a graphical representation for communicating with friends on a map according to an embodiment of the present invention. As shown in FIG. 4, the map shows the greater San Francisco Bay Area, where three of the four friends in the user-defined community have been displayed on the map, including the user (me) 402, Ed 404, and Sam 406, and the respective icons on the map for the user (me) 408, Ed (410), and Sam (412). Upon putting themselves on the map, each friend can update his or her message and location as appropriate. For example, Ed 404 has arrived at the destination and updates his friends with the instant message 414 "playing craps". Each time a member of the community updates his or her status, an alert message is sent to the other members of the group. In this manner, the present invention provides a platform to allow the four friends to declare themselves as a community, and provides the ability to communicate with each other through a shared map. Through this connected media space, the group of friends has a synchronized awareness of the locations and statuses of the other members.

In one embodiment, the disclosed method may incorporate the global position system (GPS) capabilities of a mobile device, which is available in some of the cellular phones. In this example, when Sam 406 turns on her mobile device, her location may be determined by using the global position of her mobile device and she can be automatically placed on the map, showing she is on Highway 101 driving to the destination. Thus it makes sense to her friends when Sam sends a message 416 "late—on my way".

Figure 5:
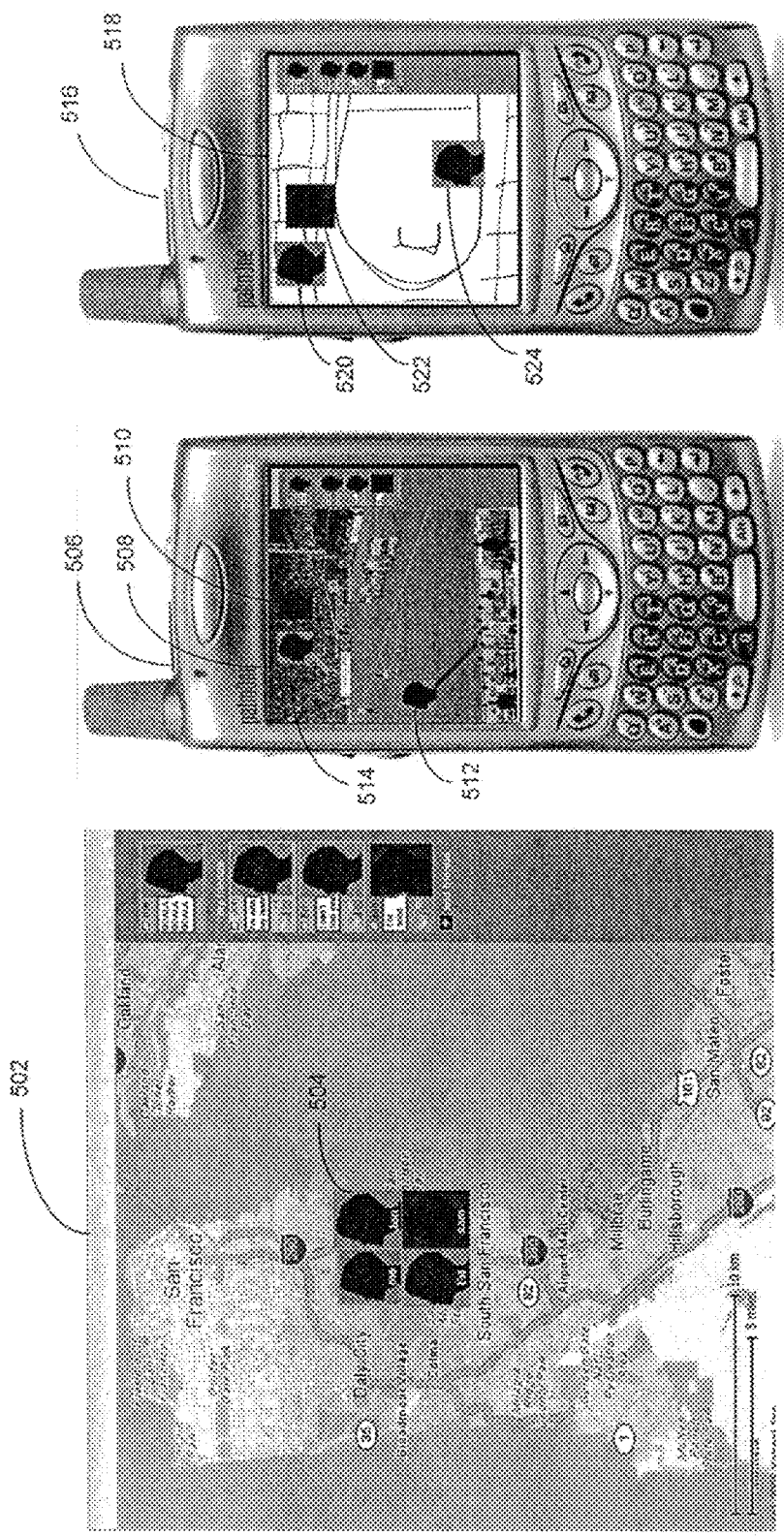
FIG. 5 illustrates graphical representations of public and private maps according to an embodiment of the present invention.

FIG. 5 illustrates graphical representations of public and private maps according to an embodiment of the present invention. In this example, the screen 502 shows a public map of the greater San Francisco Bay Area where all four friends of the user-defined community have arrived at the destination. The location of the friends is shown as a cluster of icons 504, which is also referred to as a map icon. In one approach, a map icon may includes a thumbnail image of the user-defined private map, a name of the user-defined private map, a number of users in the user-defined private map, or a list of user names in the user-defined private map. In another approach, a map icon may also include an image of the user, a graphic image chosen by the user, a phrase chosen by the user, a label representing the emotional state of the user, a label representing the status of the user, or a label representing an action performed by the user. Upon arrival, each friend may send an instant message regarding his or her status or whereabouts.

As discussed in the background section, while conventional GPS devices are useful in providing guidance to people on the road; they often do not provide adequate information for people to locate their friends upon their arrival at the destination. For example, GPS does not work indoors, within a large building such as a convention center. The present invention bridges this gap by providing solutions to allow the friends to locate each other easily and efficiently where GPS is not available, either on the device itself or is not working such as inside.

In one approach, after the group of four friends has arrived at the destination, they may create a private map to share among themselves as there may not be a public map available to identify the locations of the friends. The disclosed method allows the friends to attach a private map to the public map at any location of interest, and be able to zoom into the private map from the public map. In addition, the disclosed method allows the friends to annotate and share the private map in a wide variety of data formats, such as photo images, hand-drawn images, and a scanned image from a local map. As shown on the screen of the mobile device 506, a photograph 508 is used as a private map shared among the friends. The photograph 508 may be taken by the camera built in to the mobile device 506. On the photograph 508, each friend may identify his or her location on this shared private map (photograph).

In another approach, a hand-drawn map 518 is used to communicate their locations to each other on the mobile device 516. In this example, three of the four friends have put themselves on the map, as shown by the icons 520, 522, and 524 respectively.

Figure 6:
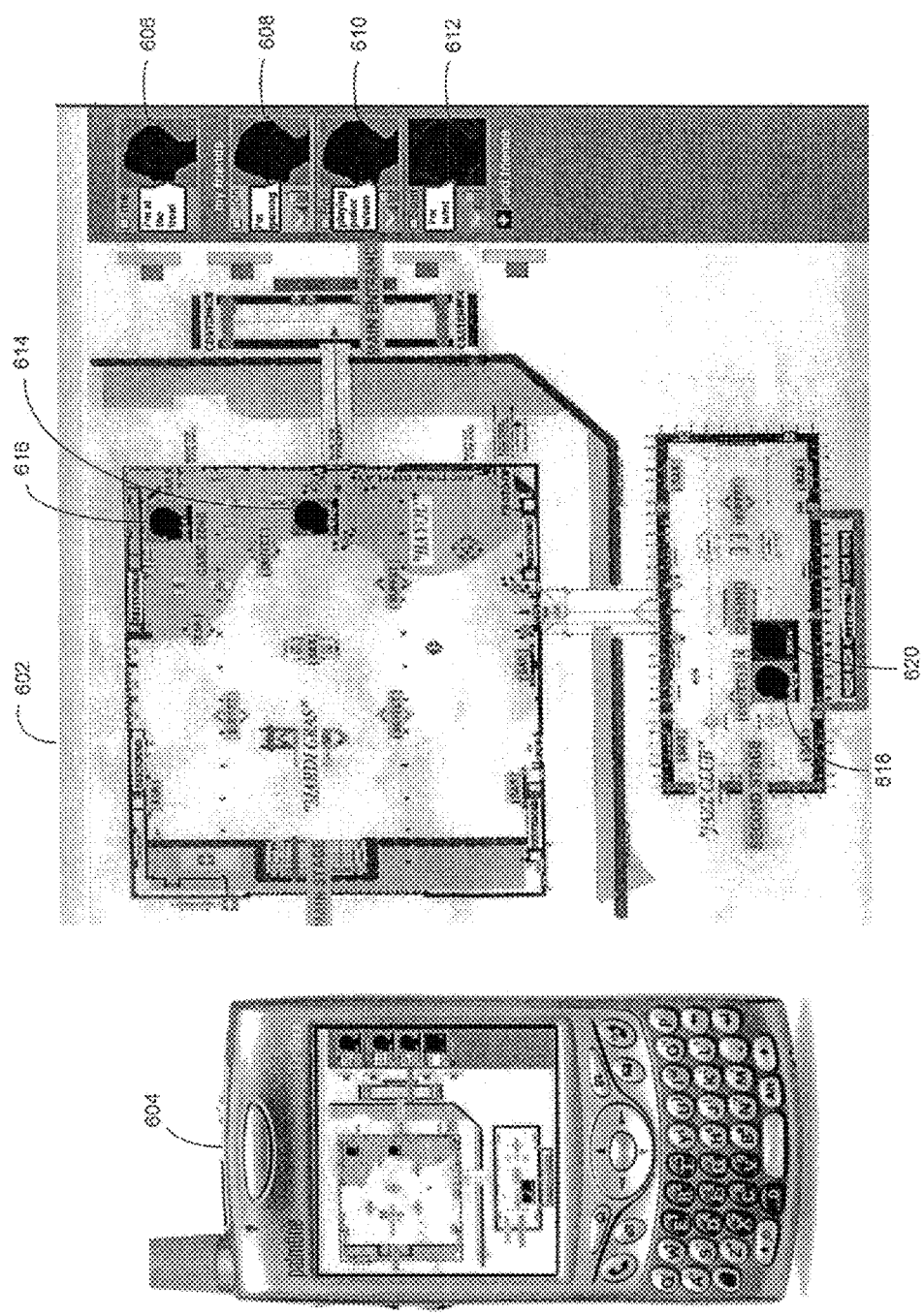
FIG. 6 illustrates a graphical representation of another private map shared among the friends according to an embodiment of the present invention.

FIG. 6 illustrates a graphical representation of another private map shared among the friends according to an embodiment of the present invention. The screen 602 is an enlarged picture shown by the mobile device 604; the screen shows a floor plan of a private location for a company party, for example. Note that the private map of this company party venue may be obtained in various ways. It may be downloaded to the mobile device from a website or from an email attachment. This private map may also be obtained by taking a picture of the venue map handed out at the entrance using the camera of the mobile device and converting the photo image into a shared map. The shared map may be created in any data format, such as JPEG, TIF, Word, Powerpoint, etc. In this example, the four friends me 606, Jon 608, Ed 610, and Sam 612 have put their respective locations 614, 616, 618, and 620 on this private map. In another example, if the friends are in an amusement park or a shopping mall, a photo image of the map or directory of the amusement park or shopping mall may be used as the shared private map for the group of friends.

Each friend may send an instant message to communicate with other friends in the group. For example, upon arrival, the user (me) 606 may send the message "I'm here @ front door". By doing so, the message brings up the application in her friends' mobile devices informing them of her arrival and waiting for their responses. In response, Jon 608 may send the message "Bar by games". Ed 610 can send the message "playing poker w/sam", and Sam 612 can send the message "with ed". In this way, the friends keep each other informed of their whereabouts, and it would be easy to find each other in a large, crowded, and noisy place where cellular phones may not be an effective means for communicating with other members of the group.

Over time, each of the friends may have moved around, and their positions on the map may not be updated. The application enables interactive update of a person's location by simply dragging her icon to a new location on the shared map. Each update from one of the friends may be broadcasted to the group, which provides incentive for other friends to update their respective locations. This method of communication is much more efficient than having the friends call each other back and forth to describe their new locations and to keep everyone in the group informed where their friends are.

In yet another example, a shared map of a different venue can be employed to assist a group of friends in locating each other. For example, the seating charts of a stadium, such as the Stanford Stadium, can be imported to be the shared map in the event the group of friends has different seats to the sports event. In addition, the seating charts of movie theaters or concert halls can be imported as the shared map. Moreover, an interior layout of a building can also be imported as the shared map. Such seating charts and interior layout of a building may be downloaded prior to attending the event, or the friends may be prompted to download the seating chart interactively when they arrive at the event.

Figure 7B:
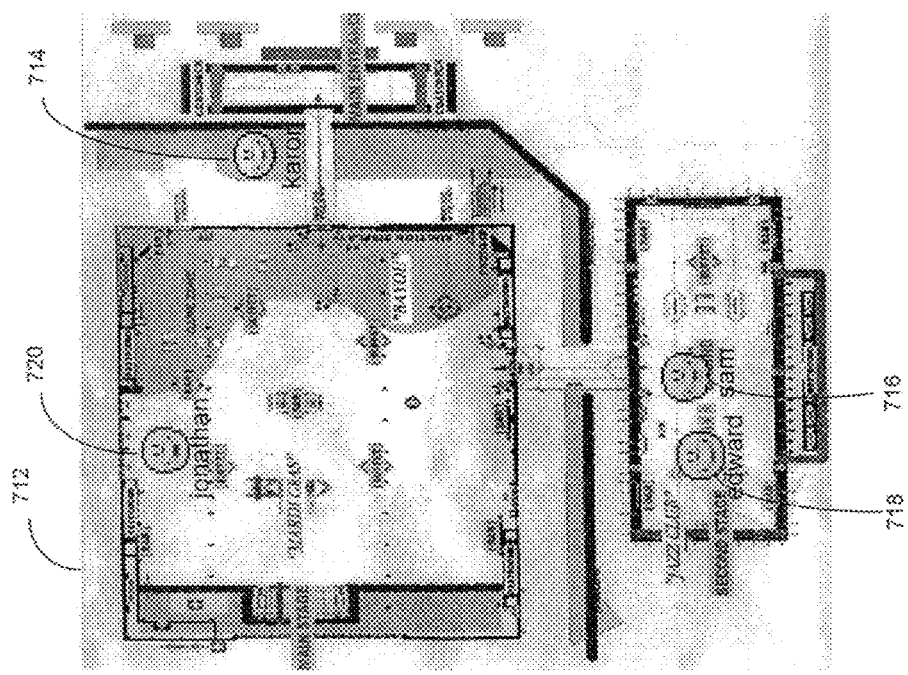
FIG. 7B illustrates a graphical representation of using emotional icons on a private map according to an embodiment of the present invention.
Figure 7A:
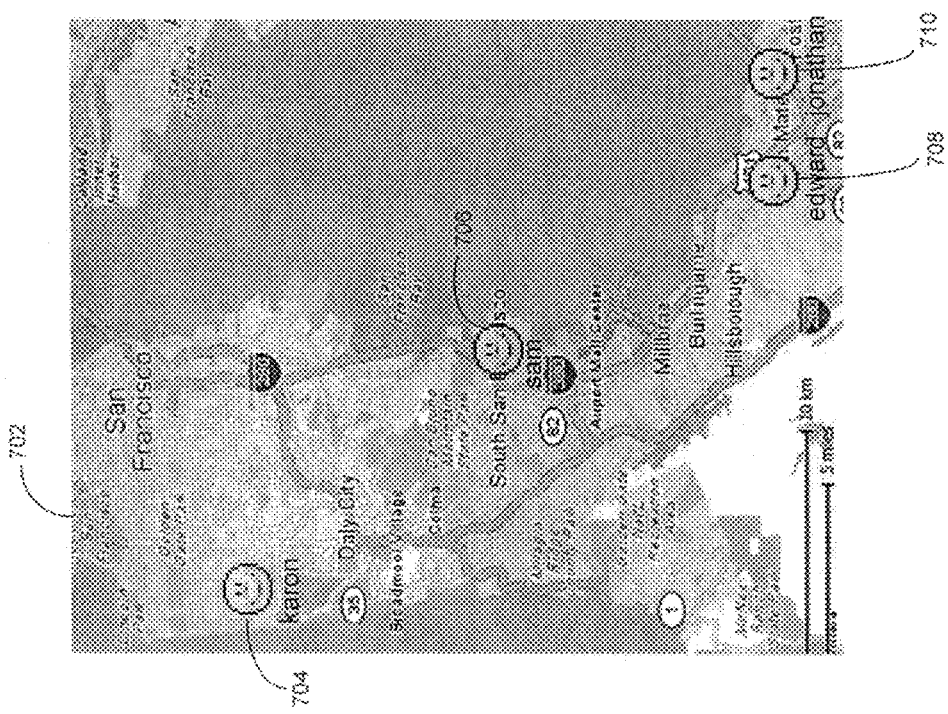
FIG. 7A illustrates a graphical representation of using emotional icons on a public map according to an embodiment of the present invention.

FIG. 7A illustrates a graphical representation of using emotional icons on a public map according to an embodiment of the present invention. The screen 702 shows a map of the Greater San Francisco Bay Area. The group of friends has placed themselves on the map with their choice of emotional icons, also known as emoticons. By doing so, the group of friends is socially linked to each other through a shared map. In addition to providing location information on the map, the emoticons provide an emotional message from each member of the group. For example, the emoticons may show happy, sad, frustrated, stressed, excited, bored, or other types of faces. In other embodiments, labels representing status of the friends, such as in transit, on the freeway, off the freeway, or other status messages, may be displayed on the map. In yet other embodiments, labels representing actions performed by the friends, such as parking my car, just arrived, on foot, running, etc., may be displayed on the map. In this example, Karon, Sam, Edward, and Jonathan are represented by the emoticons 704, 706, 708, and 710 respectively. FIG. 7B illustrates a graphical representation of using emotional icons on a private map according to an embodiment of the present invention. The screen 712 shows a map of a private venue of interest. The group of friends has placed themselves on the map with emoticons. Similarly, Karon, Sam, Edward, and Jonathan are represented by the emoticons 714, 716, 718, and 720 respectively. In general, different type of icons may be used in place of the emoticons. For examples, an icon may be an image of the user, a graphic image chosen by the user, or a phrase chosen by the user.

FIG. 8 illustrates a method for tagging contextual media to personal locations on a map according to an embodiment of the present invention. The disclosed method enables each of the friends to attach media information regarding his or her location and share information about what he or she is doing or watching among the friends in the group. In general, most people are better at locating distinct landmarks than locating names, numbers, or navigating through directional (north, east, south, west) instructions. When a person searches for a particular place, it would be helpful to look for a certain distinct landmark rather than a particular name or number. For example, it would be easier to look for a shop with a picture of the entrance of the shop displayed in one's mobile device than to look for the shop that is located at B230 in the shopping mall's directory. By having the ability to attach a picture to the map in this application, a member in the group can take a picture of a distinct location near her. And the picture can be sent to her friends to assist them in finding her.

As shown in FIG. 8, five members of the group have placed themselves on a shared map 801, which in this example is a venue map for a company party. The group of friends Jonathan, Karon, Edward, Sam, and Chad are represented by the emoticons 802, 806, 810, 811, and 814 respectively. In this figure, Jonathan is near the buffet stand, and he may attach a picture of chefs preparing food 804; Karon is near the main entrance, and she may attach a picture of the entrance 808; Edward and Sam are a show on the second stage, and they may attach a picture of the show 812; and Chad is watching a show on the main stage, and he may attach a picture of the band on stage 816. The multimedia messaging service (MMS) technology is used to transfer images among the group of friends between their corresponding mobile devices. With the contextual information attached to each friend's location on the shared private map, it is easier for the group of friends to find each other.

Figure 9:
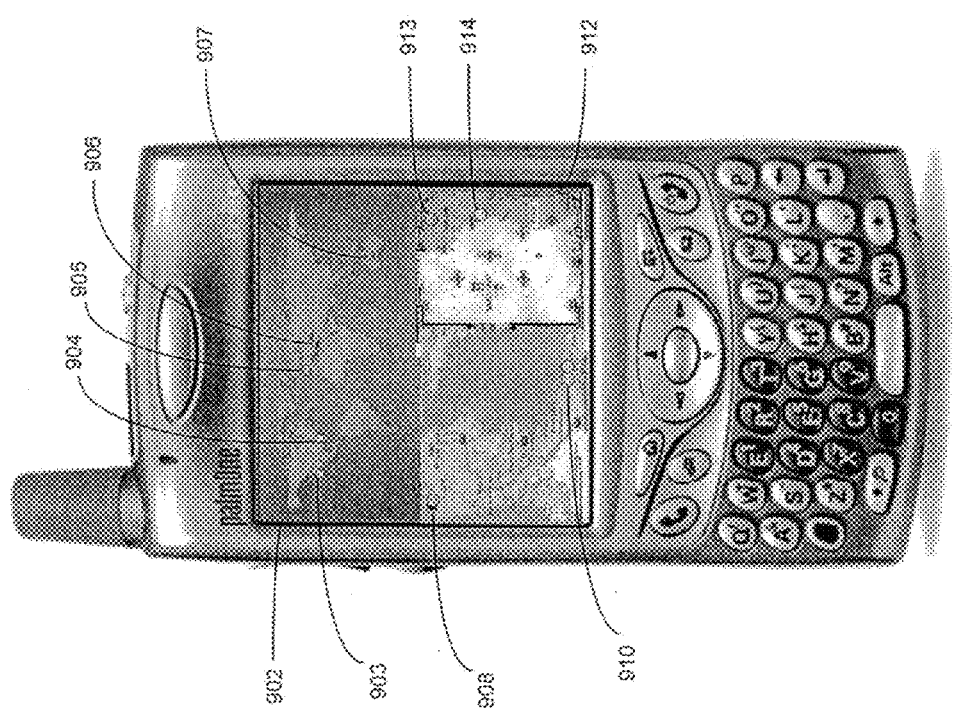
FIG. 9 illustrates a method for multilevel viewing of multiple communities according to an embodiment of the present invention.

FIG. 9 illustrates a method for multilevel viewing of multiple communities according to an embodiment of the present invention. In this example, at the top level, multiple communities are shown in San Francisco 903, New York 904, London 905, Baghdad 906, and Sydney 907 on a world map 902. A user in the general community may navigate a local community to view the status of the members in that community. For example, when a user clicks on the community in San Francisco 903, a regional map of the San Francisco Bay Area 908 is shown in the lower left corner. If the user further clicks on the group of friends indicated by emoticons 910, a venue map 912 of that location is displayed to show the whereabouts of the two friends 913 and 914 in the venue map 912. In this manner, a user may keep track of multiple communities in a multilevel viewing environment.

Figure 10:
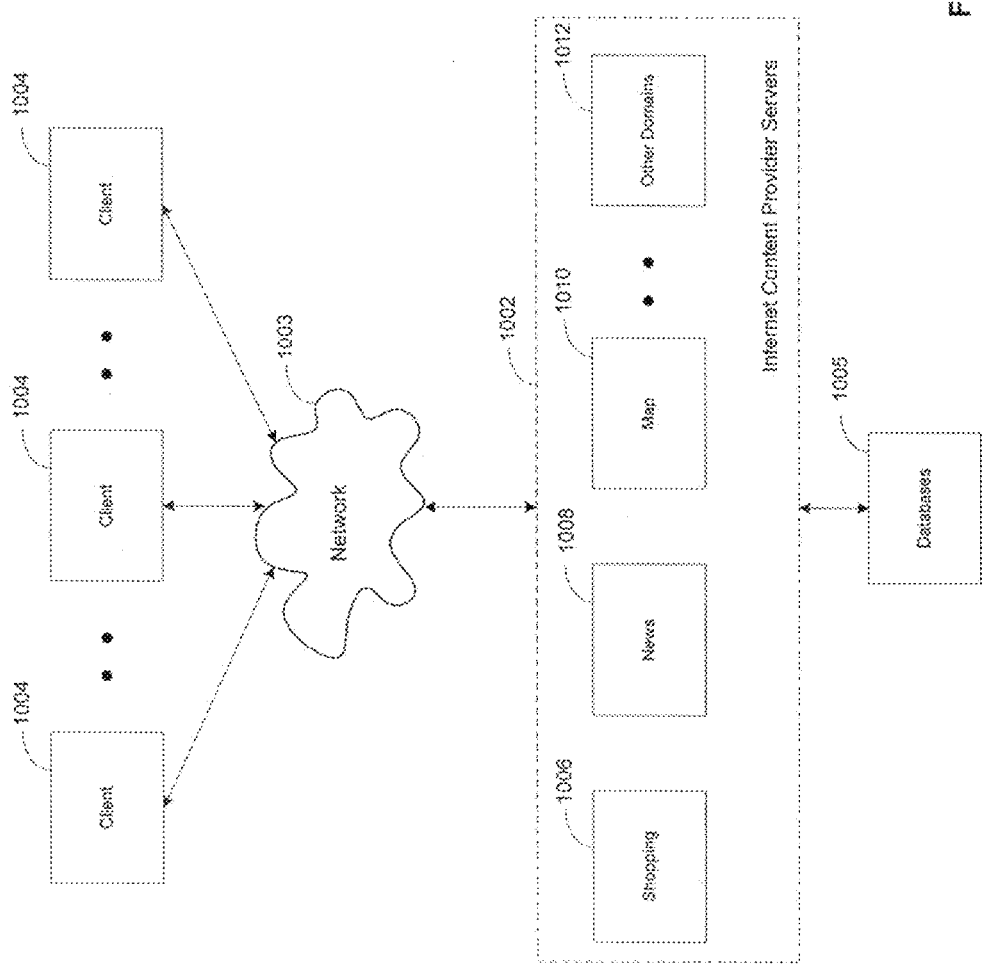
FIG. 10 illustrates a system for running map applications on a website according to an embodiment of the present invention.

FIG. 10 illustrates a system for running map applications on a website according to an embodiment of the present invention. The system includes one or more Internet content provider servers 1002, databases 1005, and one or more clients 1004. The servers 1002 interface with the clients 1004 via a communication network 1003. The Internet content provider servers 1002 are host servers operable to provide content to clients 1004 via the network 1003. One or more of the servers host websites and include the map functions. The databases 1005 are operable to store data provided by the servers 1002 and/or clients 1004. The databases can communicate with the servers 1002 or clients 1004 via the network 1003. The databases can store data items included in the web pages, such as maps and user information.

Alternatively, the servers 1002 may include the databases, processors, switches, routers, interfaces, and other components and modules. Each of the servers 1002 may comprise one or more servers, or may be combined into a fewer number of servers than shown, depending on computational and/or distributed computing requirements. The servers 1002 may be located at different locations relative to each other. The databases may also be separately connected to the servers 1002. There may be more or less than two databases, depending on computational and/or distributed computing requirements. The databases may be located at different locations relative to each other and the servers 1002.

Each of the clients 1004 may be a general-purpose computer, such as a personal computer, having a central processing unit (CPU), a memory, an input device, an output device, and a display. Other computer system configurations, including Internet appliances, hand-held devices, wireless devices, portable devices, wearable computers, cellular or mobile phones, portable digital assistants (PDAs), multi-processor systems, microprocessor-based or programmable consumer electronics, set-top boxes, network PCs, mini-computers, and the like may also be implemented as the clients 1004. Each of the clients 1004 may also implement analog and digital baseband circuitry, power management circuitry, radio frequency (RF) transceiver, and battery interface and charging circuitry. Clients 1004 may include one or more applications, program modules, and/or sub-routines. As an example, clients 1004 may include a browser application (e.g., Internet Explorer, etc.) and a graphical user interface (GUI) to access websites and web pages provided by the servers 1002 and data stored at the databases 1005. Clients 1004 may be remote from each other, the servers 1002, and/or the databases 1005.

The network 1003 is a communications network, such as a local area network (LAN), a wide area network (WAN), or the Internet. When the network 1003 is a public network, security features (e.g., VPN/SSL secure transport) may be included to ensure authorized access within the system.

The servers 1002 further include a plurality of individual domains, for example, shopping domain 1006, news domain 1008, maps domain 1010, and other domains 1012. A domain is a computer system implemented with different hardware and software for a specific application, such as the shopping applications, news applications, and maps applications. The maps applications of the present invention are run on the maps domain 1010, which implement Web 2.0 functionalities using a combination of HTML, CSS, JavaScript, and "Asynchronous JavaScript and XML" (AJAX).

In particular, JavaScript is used to create, monitor, change, and destroy objects and change the state of various image objects, in addition to keeping track of browser behavior changes initiated by the user. For example, when a user starts dragging an original thumbnail image in the browser window, the browser fires "mouse down" and "mouse move" events which are captured by the JavaScript, and an object is created to handle the event. The object is effectively a copy of the original thumbnail image, and the copy of the image is being moved around. In other words, each object has states, and such states are created and modified in response to user-initiated changes (events) to the browser behavior.

As described above, the process of monitoring and updating states of an object is event-driven. When a user performs a specific action, JavaScript that runs in the background determines the exact browser event that has been initiated according to a set of user cases. For example, if the user clicks outside an icon and drags, that action is interpreted as the intent to draw a selection rectangle. Similarly, if the user clicks directly on an icon and starts to move by a distance greater than five pixels, that action is interpreted as a drag. Then, the JavaScript starts to monitor the mouse movement and attaches the icon to the cursor at that point. While moving the cursor, the JavaScript updates the attached icon's positions and waits for the user to release the icon. Upon the icon's being released, the JavaScript determines the location of the cursor within the browser window. If the icon is dropped on a valid drop target, the icon is placed on the dropped location on the map. If the icon is dropped on an invalid drop target, a reset action is initiated, and the icon is snapped back to its original location. While the user is dragging an icon, the JavaScript monitors where the cursor is, and determines whether it is over a valid drop target or an invalid drop target. When the cursor is over a valid drop target, the JavaScript causes the valid drop target to be highlighted, providing a positive feedback to the user. When the cursor moves out of the valid drop target, the JavaScript deactivates the highlighted area.

Figure 11:
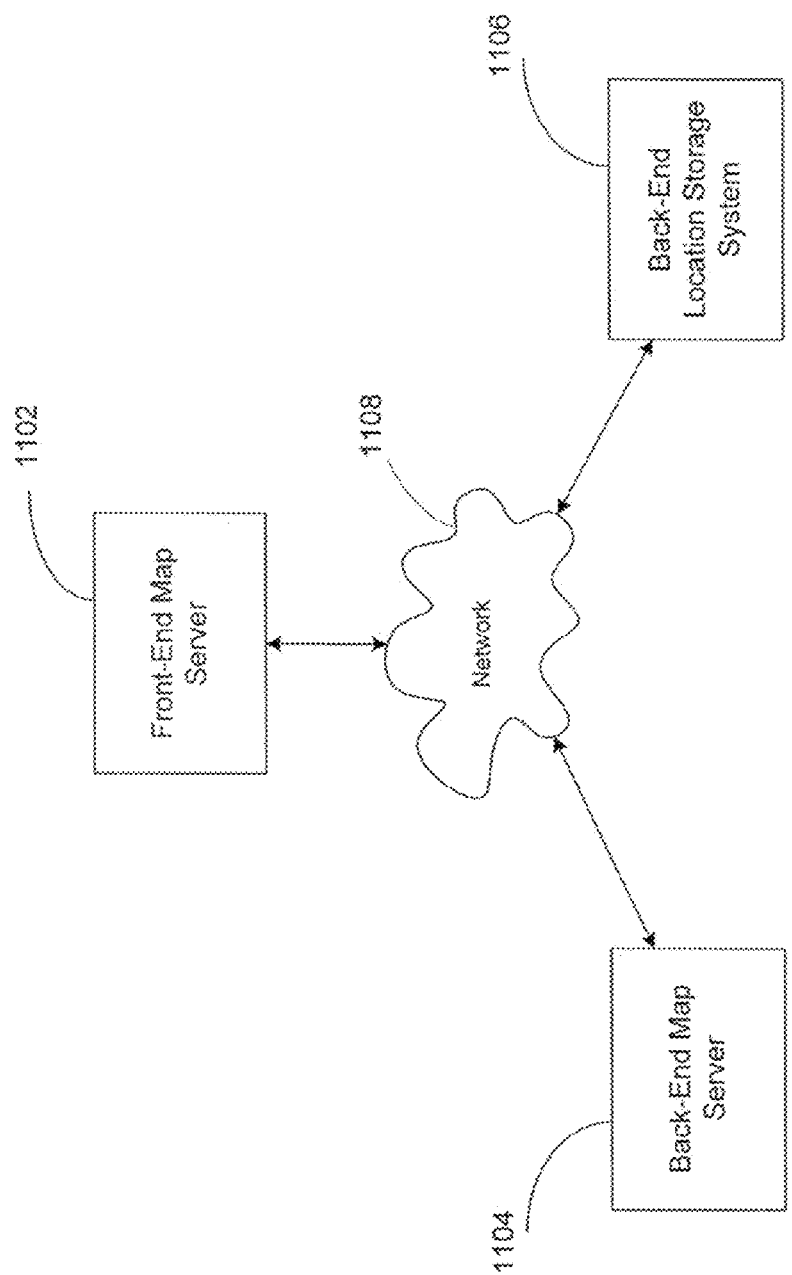
FIG. 11 illustrates an implementation of the map domain of FIG. 10 according to an embodiment of the present invention.

FIG. 11 illustrates an implementation of the map domain of FIG. 10 according to an embodiment of the present invention. As shown in FIG. 11, the maps domain includes a front-end map server 1102, a back-end map server 1104, and a back-end location storage system 1106. The front-end map server 1102, a back-end map server 1104, and a back-end location storage system 1106 are connected via any known type of network 1108 or communication mechanism.

The front-end map server 1102 performs several functions. It accepts requests for map tiles from the client and fetches them from the back-end map server 1104. Where necessary, the front-end map server 1102 may perform additional processing on the map tiles such as cropping or scaling, before returning them to the client. It also accepts requests for current location information about groups of users. These are obtained from the back-end location storage system 1106. It also receives requests to update the user's location, which is stored in the back-end location storage system 1106. Requests for map tiles may be combined with a user's location data in the front-end map server 1102, although leaving this to the client is preferred.

In addition, the front-end map server performs the function of linking the one or more user-defined private maps to the public map. Specifically, it associates the public map and the one or more user-defined private maps as linked set of maps, where each map is linked to another map in the linked set of maps. It may access the linked set of maps through the corresponding map icons. In one approach, the front-end map server 1102 may associates a single point in a first map to a single point in a second map in the linked set of maps by performing mathematical translations between the first map's coordinate system and the second map's coordinate system. It may also associates an area in a first map to a second map in the linked set of maps by performing mathematical translations between the first map's coordinate system and the second map's coordinate system. Note that these functions of the front-end map server may also be performed at the client device.

The front-end client or device (shown as item 1004 in FIG. 10) takes the map provided by the back-end map server 1104 and the location information retrieved from the back-end location storage system 1106 and plots one on the other. Multiple users can be plotted at once, and different types of information can be switched on and off (e.g., only show their emoticon and name). The front-end client is responsible for converting the map's coordinate system to a local screen-based version, where parts of the map (and therefore users) may be off-screen and can be scrolled on. The front-end client may connect directly to only the front-end map server, or to any of the back-end servers depending on the client's capabilities.

Front-end clients on desktops may be implemented with web browsers such as DHTML and JavaScript to render a scrollable map from tiles. AJAX or normal form posting/page fetching may be used to read/write new user location details to the back-end map server 1104 and the back-end location storage system 1106. Front-end mobile clients on cellular phones or PDAs may be developed natively for each type of mobile device, or on some more common platform. In one approach, the J2ME (mobile Java) is used to communicate with the back-end location storage system 1106 and the back-end map server 1104 via HTTP.

A user's location is represented using some kind of coordinate system, such as latitude and longitude (and height), or most simply x and y (and z) in the back-end location storage system 1106. Each user's location can be annotated with a number of other pieces of information, including but not limited to: the user's name, the user's nickname, an emoticon, a status message, an indicator showing how long it was since the user last updated its location, a photograph of the user's surroundings, an audio clip, and an IM. In one approach, this information is stored in a relational database. In another embodiment, this information may be stored as specific "tag" information on a photo in a photo-sharing system, such as the Flickr (http://www.flickr.com/) in Yahoo's photo domain. The back-end location storage system 1106 may be implemented using an (SQL) database behind any web technology, such as the PHP, and .NET.

Updates to the back-end location storage system 1106 may be logged by the database by time, so that other information not tagged geographically (not geo-tagged), like a phone taken by a camera, can get a location associated with it using a combination of the media's creation timestamp with the date a person's location was updated. The database should support an external API that a user may log into and query for her location at a given time (or over a time-range). Note that a person may have multiple "valid" locations at any given time in the database. For example, a user may be at Disneyland with a certain geo-coordinate and also inside the haunted house at a certain room and floor. The "manual" process of providing coordinates means that the updates may be sent to the database from either a mapping application, or from another source, like a normal web page.

The back-end map server 1104 is responsible for providing the map the user's coordinates are referencing. This may be a tile server providing a collection of "tiles" (or pieces of a map) to a particular client device, or may be a server providing a single photograph of a location of interest, or some combination thereof (a tile server serving up pieces of any two-dimensional map/photograph).

In the back-end map server 1104, sub-maps contain additional information about which maps are contained within them, and which maps they are contained in. In each case, there is a mathematical transformation between the different coordinate systems used by the different maps. For example, a sub-map of a restaurant's seating chart may be represented as a single latitude and longitude on a world map. A venue may be represented as a set of latitude and longitude points (forming a polygon), where there exists a mapping between the venue's x and y point and the latitude and longitude on the main map, and thus the sub-map can be shown as an area on the world map. A user's location on one map can therefore be obtained by transforming her local coordinates at each sub-map until the world-map is reached, or until the top-level map with no other container is reached.

The back-end map server 1104 includes data that makes up the map. The back-end map server 1104 also performs the function of pre-rendering the data into tiles, and post-processing the data to make the tiles or maps compatible with the front-end map server 1102 and clients. For example, the data that makes up the map may include vector information (lines for streets etc.). This data is used to create tiles, which are small square images that graphically represent that vector information. These tiles are typically served as in Yahoo! Maps. The post-processing step may be required to cut these tile's into smaller pieces to accommodate the poor network and memory characteristics of mobile devices. Other sources of maps include photo databases, like Flickr, which may be pre-processed into tiles, or may be processed as needed into tiles or some form of scaled images.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A method comprising:
displaying, by a processor, a first map image comprising a world map at a first level of magnification to a user;
displaying, by the processor, presence of a plurality of user communities respectively situated at a plurality of locations, at least two of the plurality of locations being in different countries on the first map;
facilitating, by the processor, display navigation of the user to at least one of the user communities to view status of members in the at least one user community wherein the at least one community does not include the user;
receiving, by the processor, a selection of the at least one user community navigated to by the user wherein the selected user community comprises at least two users located at a venue;
displaying, by the processor, a second map image of a location of the selected community at a second level of magnification;
receiving, by the processor, a further selection of the community associated with the second map image by the user;
displaying, by the processor, a venue map of the location at which the selected community is situated at a third level of magnification showing respective locations of the at least two users in the selected community within the venue upon the further selection, and
displaying, by the processor, the first map image, the second map image and the venue map at respective magnification levels in a single multi-level view showing the plurality of user communities.

2. The method of claim 1, the second map image is map of a city.

3. The method of claim 1, the third level of magnification is greater than the second level of magnification and the second level of magnification is greater than the first level of magnification.

4. The method of claim 1, users in the plurality of user communities are associated with emoticons that provide an emotional message to other users.

5. The method of claim 1, receiving, by the processor, an image of a location of a user in the selected community.

6. The method of claim 5, displaying, by the processor, the image in conjunction with a representation of the user on the venue map.

7. A computing device comprising:
a processor;
a non-transitory storage medium for tangibly storing thereon program logic for execution by the processor, the program logic comprising:
first map image display logic, executed by the processor, for displaying, a first map image comprising a world map at a first level of magnification to a user and for displaying presence of a plurality of user communities respectively situated at a plurality of locations, wherein at least two of the plurality of locations being in different countries on the first map;
facilitating logic, executed by the processor, for facilitating display navigation of the user to at least one of the user communities to view status of members in the at least one user community wherein the at least one user community does not include the user;
user community selection receiving logic, executed by the processor, for receiving a selection of the community navigated to by the user;
second map image display logic, executed by the processor, for displaying a second map image of a location of the selected community at a second level of magnification upon receiving the selection;

receiving logic, executed by the processor, for receiving a further selection of the community associated with the second map image by the user wherein the selected user community comprises at least two users located at a venue;

venue map display logic, executed by the processor, to display a venue map of the location at which the selected community is situated at a third level of magnification showing respective locations of the at least two users in the selected community within the venue upon the further selection; and logic for displaying the first map image, the second map image and the venue map are at respective magnification levels in a single multi-level view showing the plurality of user communities.

8. The computing device of claim 7, the second map image is map of a city.

9. The computing device of claim 7, the third level of magnification is greater than the second level of magnification and the second level of magnification is greater than the first level of magnification.

10. The computing device of claim 7, users in the at least one user community are associated with emoticons that provide an emotional message to other users.

11. A non-transitory computer readable storage medium, having stored thereon, processor-executable instructions for:

displaying a first map image comprising a world map at a first level of magnification to a user;

indicating presence of a plurality of user communities respectively situated at a plurality of locations, at least two of the plurality of locations being in different countries on the first map;

facilitating display navigation of the user to at least one of the user communities to view status of members in the community wherein the at least one user community does not include the user;

receiving a selection of the at least one user community navigated to by the user wherein the selected user community comprises at least two users located at a venue;

displaying a second map image of a location of the selected community at a second level of magnification;

receiving a further selection of the community by the user;

displaying a venue map of the location at which the selected community is situated at a third level of magnification showing respective locations of the at least two users in the selected community within the venue upon the further selection, the instructions for displaying the first map, the second map and the venue map further cause a display of the first map image, the second map image and the venue map at respective magnification levels in a single multi-level view showing the plurality of user communities.

12. The medium of claim 11, the third level of magnification is greater than the second level of magnification and the second level of magnification is greater than the first level of magnification.

* * * * *